United States Patent
Horisaka et al.

(10) Patent No.: US 9,413,200 B2
(45) Date of Patent: Aug. 9, 2016

(54) STATOR AND ELECTRIC MOTOR USING SAME

(71) Applicant: Mitsubishi Electric Corporation, Tokyo (JP)

(72) Inventors: Kentaro Horisaka, Tokyo (JP); Koki Naka, Tokyo (JP); Shinichi Yamaguchi, Tokyo (JP); Masaya Harakawa, Tokyo (JP); Kazuaki Ando, Tokyo (JP); Kenta Ozaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/890,089

(22) PCT Filed: May 20, 2013

(86) PCT No.: PCT/JP2013/003180
§ 371 (c)(1),
(2) Date: Nov. 9, 2015

(87) PCT Pub. No.: WO2014/188466
PCT Pub. Date: Nov. 27, 2014

(65) Prior Publication Data
US 2016/0105061 A1    Apr. 14, 2016

(51) Int. Cl.
*H02K 3/18* (2006.01)
*H02K 3/02* (2006.01)

(52) U.S. Cl.
CPC ... *H02K 3/18* (2013.01); *H02K 3/02* (2013.01)

(58) Field of Classification Search
CPC .................................. H02K 3/02; H02K 3/18
See application file for complete search history.

(56) References Cited

U.S. PATENT DOCUMENTS

| | | | | |
|---|---|---|---|---|
| 6,683,396 B2* | 1/2004 | Ishida | ...................... | B25F 5/00 310/130 |
| 8,946,966 B2* | 2/2015 | Shimizu | ................... | H02K 1/06 310/191 |

FOREIGN PATENT DOCUMENTS

| | | |
|---|---|---|
| JP | 10-174330 A | 6/1998 |
| JP | 2004-153874 A | 5/2004 |
| JP | 2005-278373 A | 10/2005 |
| JP | 2010-183741 A | 8/2010 |
| JP | 2010-183788 A | 8/2010 |

OTHER PUBLICATIONS

Search Report issued on Jul. 16, 2013 by the International Searching Authority in related Application No. PCT/JP2013/003180.
Written Opinion issued on Jul. 16, 2013 by the International Searching Authority in related Application No. PCT/JP2013/003180.
Communication issued on Mar. 2, 2015 by The Intellectual Property Office of Taiwan in related Application No. 102121875.

* cited by examiner

*Primary Examiner* — Dang Le
(74) *Attorney, Agent, or Firm* — Sughrue Mion, PLLC

(57) ABSTRACT

A stator according to the present invention includes: a cylindrical stator core; a plurality of tooth portions provided along a circumferential direction of the stator core; and windings disposed in a plurality of slots provided between the tooth portions and wound around the tooth portions. The windings are configured by materials having different electrical resistivities. A ratio of a sectional area of a material having a high electrical resistivity to a sectional area of a material having a low electrical resistivity in the slot is equal to or larger than 1 and equal to or smaller than a ratio of the electrical resistivity of the material having the high electrical resistivity to the electrical resistivity of the material having the low electrical resistivity.

4 Claims, 6 Drawing Sheets

| | | ELECTRIC WIRE B | | | |
|---|---|---|---|---|---|
| | | SILVER | COPPER | GOLD | ALUMINUM |
| ELECTRIC WIRE A | SILVER | | 1.06 | 1.39 | 1.67 |
| | COPPER | | | 1.32 | 1.58 |
| | GOLD | | | | 1.20 |
| | ALUMINUM | | | | |

*FIG. 8*

|  |  | ELECTRIC WIRE B | | | |
|---|---|---|---|---|---|
|  |  | SILVER | COPPER | GOLD | ALUMINUM |
| ELECTRIC WIRE A | SILVER |  | 1.06 | 1.39 | 1.67 |
|  | COPPER |  |  | 1.32 | 1.58 |
|  | GOLD |  |  |  | 1.20 |
|  | ALUMINUM |  |  |  |  |

STATOR AND ELECTRIC MOTOR USING SAME

TECHNICAL FIELD

The invention relates to an electric motor and a stator used for the electric motor.

BACKGROUND ART

In a conventional stator, a stator core is made of stacked steel plates. An insulator is embedded in the stator core. The insulator is an insulator made of a synthetic resin. The annular stator core is formed with tooth portions protruding in a diametrically inward direction at a plurality of points at which an inner periphery thereof is equally divided in a circumferential direction. Wire materials are wound around the respective tooth portions through the insulator, so that a plurality of layers of windings is formed. In the wire materials configuring the winding, one layer of the innermost side is an aluminum wire, and other five layers of the outer sides are copper wires (refer to Patent Document 1).

In another conventional stator, an insulator is disposed in a stator slot of a stator iron core. Main windings are accommodated at an inner side of the insulator. The main windings are formed by winding main magnet wires into an irregular winding. The number of the magnet wires is 34 wires, for example. Auxiliary windings are accommodated in spaces formed between the adjacent main windings. The auxiliary windings are formed by winding auxiliary magnet wires by the same number as the main windings. A wire diameter of the auxiliary magnet wire is 154/1000 of the main magnet wire.

In another conventional stator, aluminum is used for the auxiliary magnet wire forming the auxiliary windings. Copper is used for the magnet wire of the main windings (refer to Patent Document 2).

PRIOR ART DOCUMENT

Patent Document

[Patent Document 1] JP-A-2010-183788 (for example, paragraphs [0028], [0030] and [0032], and FIG. 1)

[Patent Document 2] JP-A-H10-174330 (for example, paragraphs [0009] and [0018], and FIG. 1)

SUMMARY OF THE INVENTION

Problems that the Invention is to Solve

Patent Documents 1 and 2 disclose the technology where the copper wire and the aluminum wire are used for the windings of the stator. However, Patent Documents 1 and 2 do not disclose a configuration for reducing a resistance of the winding when materials having different electrical resistivities are used for the winding.

It is therefore an object of the present invention to provide a configuration capable of reducing a resistance of a winding when materials having different electrical resistivities are used for the winding.

Means for Solving the Problems

A stator according to the present invention includes a cylindrical stator core; a plurality of tooth portions formed along a circumferential direction of the stator core, and windings disposed in a plurality of slots formed between the tooth portions and wound around the tooth portions. The windings are (1) configured by materials having different electrical resistivities, (2) a ratio of a sectional area of a material having a high electrical resistivity to a sectional area of a material having a low electrical resistivity in the slot is equal to or larger than 1, and (3) is equal to or smaller than a ratio of the electrical resistivity of the material having the high electrical resistivity to the electrical resistivity of the material having the low electrical resistivity.

Advantage of the Invention

According to the present invention, when the materials having different electrical resistivities are used for the winding, it is possible to reduce the resistance of the winding.

BRIEF DESCRIPTION OF THE DRAWINGS

FIG. 8 is a table showing a combination of electric wire materials and a ratio of electrical resistivities according to the first to fifth embodiments of the present invention.

EMBODIMENTS FOR CARRYING OUT THE INVENTION

First Embodiment

Figure 1:
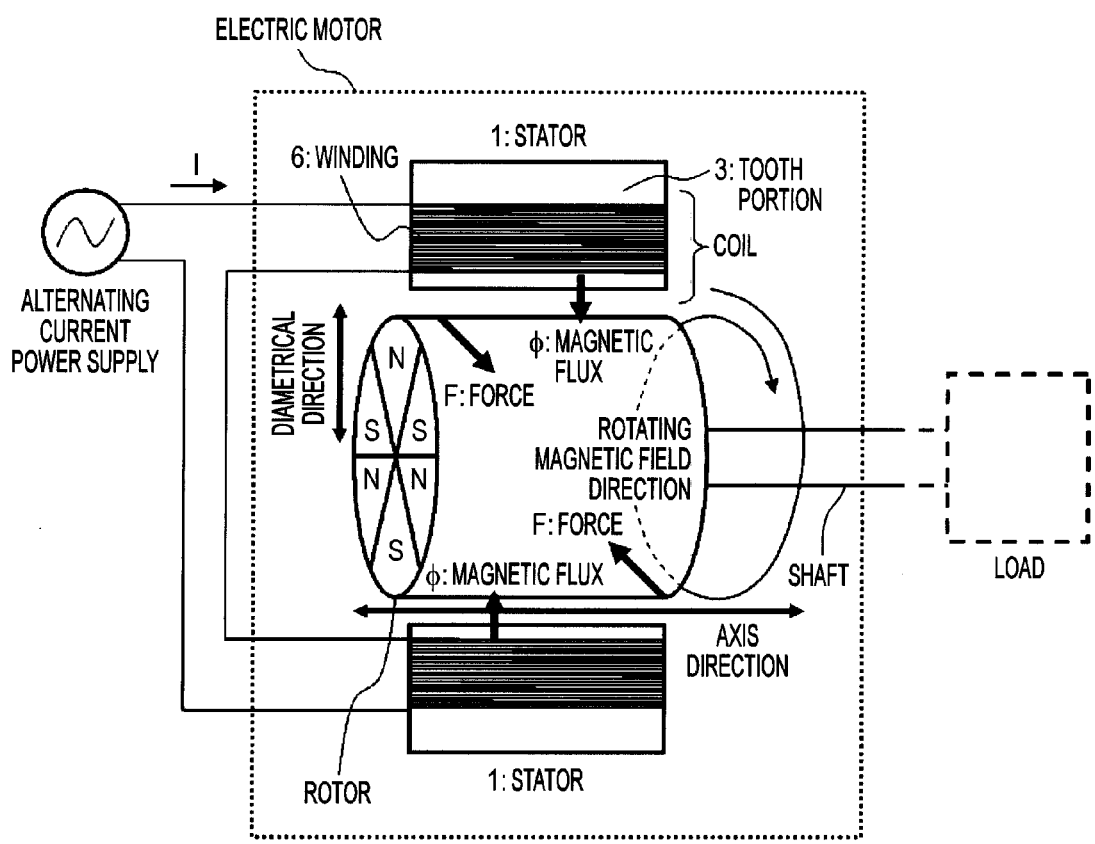
FIG. 1 illustrates an electric motor according to a first embodiment of the present invention.

A structure of an electric motor according to a first embodiment of the present invention will be described with reference to FIG. 1. FIG. 1 illustrates a structure of the electric motor according to the first embodiment.

As shown in FIG. 1, the electric motor includes a rotor, which is a part that rotates (referred to as a rotor in the following description), and a stator, which is a part that generates a rotational force for the rotor (referred to as a stator 1 in the following description). A shaft is fixed to a diametrical center of the rotor. The rotor is configured by a plurality of permanent magnets. The stator 1 has a cylindrical shape and is configured to cover the rotor from a diametrically outer side. The stator 1 is configured by disposing a plurality of coils about a shaft in a circumferential direction. An alternating current power supply supplies an alternating current to the coils of the stator 1. Also, a load is connected to the shaft.

The coils of the stator 1 generate a magnetic flux ($\phi$), as shown in FIG. 1, when the current flows through the coils. The permanent magnets of the rotor are applied with a magnetic force in a direction of the magnetic flux ($\phi$). The rotor is driven by the magnetic force applied to the permanent magnets.

Subsequently, operations of the electric motor will be described. When rotating the rotor, a direction of a magnetic field generated by the coils is sequentially moved in the circumferential direction. This can be implemented by supplying the alternating current to the coils of the stator 1. The coils of the stator 1 generate a magnetic field (hereinafter, referred to as a rotating magnetic field) in a clockwise or counterclockwise direction. In the example of FIG. 1, the coils generate a rotating magnetic field in the clockwise direction. The permanent magnets are applied with a magnetic force in the rotating direction of the rotating magnetic field. The permanent magnets are pulled to the rotating magnetic field, so that the rotor is rotated in the same direction of the rotating magnetic field.

When the rotor is rotated, the shaft is rotated together with the shaft. A rotational force of the shaft is transmitted to the load. That is, the rotational force generated for the rotor is transmitted to the load through the shaft.

Figure 2:
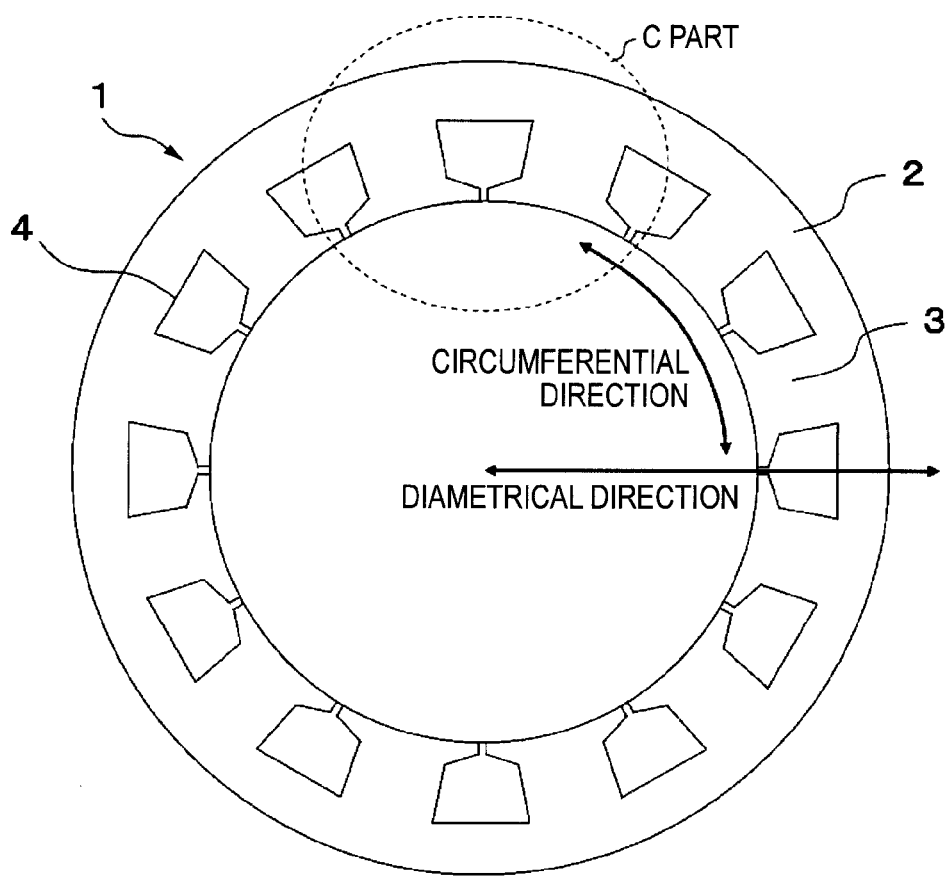
FIG. 2 is a sectional view of a stator according to the first embodiment of the present invention.

In the below, a configuration of the stator 1 of the first embodiment is described. FIG. 2 is a sectional view of the stator 1 according to the first embodiment. As shown in FIG. 2, the stator 1 is mainly configured by a stator core 2 having a cylindrical shape and tooth portions 3. As shown in FIG. 2, the tooth portions 3 are provided on an inner periphery of the stator core 2. In the first embodiment, 12 tooth portions 3 are provided in the stator 1 along a circumferential direction shown in FIG. 2.

Slots 4 are provided between the respective tooth portions 3. The slot 4 is a space part between the respective tooth portions 3. In the first embodiment, the 12 slots 4 are provided in the stator 1 along the circumferential direction shown in FIG. 2.

Figure 3:
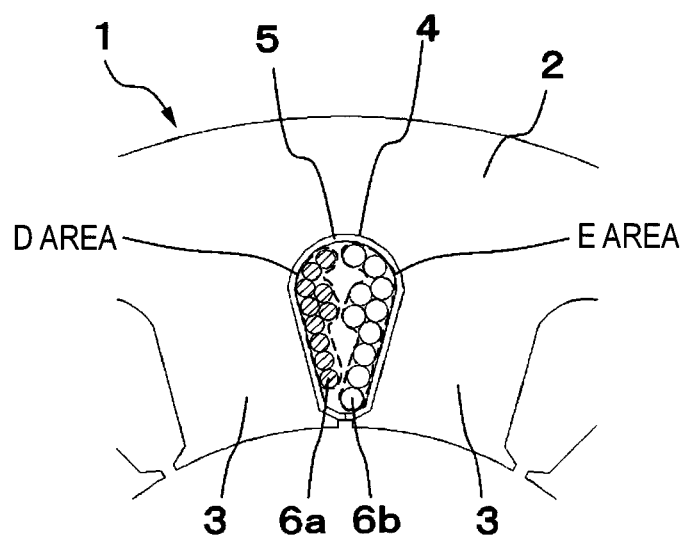
FIG. 3 is a partial sectional view of the stator according to the first embodiment of the present invention.

FIG. 3 is a partial sectional view of the stator 1 according to the first embodiment of the present invention, in which a C part of FIG. 2 is enlarged. In FIG. 3, the stator core 2 is provided with the tooth portions 3. The slots 4 are provided between the respective tooth portions 3. An insulating paper 5 is provided along a shape of the slot 4 in the slot 4.

As shown in FIG. 3, a copper wire 6a and an aluminum wire 6b are provided in the same slot 4. The copper wire 6a and the aluminum wire 6b are wound around the tooth portions 3. Hereinafter, the copper wire 6a and the aluminum wire 6b will be collectively referred to as windings 6.

Subsequently, a principle of the first embodiment will be described. A resistance of the winding 6 is denoted by a winding resistance R. When electric wires A, B are used as the windings 6, the winding resistance R is expressed by a following equation 1.

[Mathematical 1]

$$R = \left(\rho_A \times n_A \times \frac{L}{S_A} + \rho_B \times n_B \times \frac{L}{S_B}\right) \times a \quad \text{(Equation 1)}$$

In the equation 1, $\rho_A$ and $\rho_B$ indicate electrical resistivities of the electric wires A, B, respectively. $n_A$ and $n_B$ indicate the number of turns of the electric wires A, B, respectively. L indicates an average circumferential length. $S_A$ and $S_B$ indicate sectional areas of the electric wires A, B, respectively. 'a' is a constant determined by the number of slots and a wire connection method of the windings 6.

Also, a relation between an area $A_S$ of the slot 4 and the sectional areas $S_A$, $S_B$ of the electric wires A, B is expressed by a following equation 2.

[Mathematical 2]

$$A_S \times \eta = S_A \times n_A + S_B n_B \quad \text{(Equation 2)}$$

In the equation 2, $\eta$ indicates a space factor. The space factor is a ratio of an occupying area of the windings 6 to the area $A_S$ of the slot 4.

Also, a total sum of the numbers of turns of the electric wire A and the electric wire B is denoted by N. In the total sum N of the number of turns, a ratio of the electric wire A is referred to as 'x'. Also, the sectional area $S_B$ of the electric wire B is referred to as 'y' times as large as the sectional area $S_A$ of the electric wire A. Here, a following equation 3 is deduced from the equation 2.

[Mathematical 3]

$$S_A = \frac{A_S \times \eta}{N\{x + y(1-x)\}} \quad \text{(Equation 3)}$$

Accordingly, the winding resistance $R_{(x, y)}$ is expressed by a following equation 4 from the equations 1 and 3.

[Mathematical 4]

$$R(x, y) = \frac{\rho_A \times N^2 \times L \times a}{A_S \times \eta} \times \{x + y \times (1-x)\}\left\{x + \frac{\rho_B}{\rho_A}\frac{(1-x)}{y}\right\} \quad \text{(Equation 4)}$$

When the sectional areas $S_A$, $S_B$ of the electric wires A, B are the same, the winding resistance is $R_{(x, 1)}$. A condition for making the winding resistance $R_{(x, y)}$ smaller than $R_{(x, 1)}$ is expressed by a following equation 5.

[Mathematical 5]

$$R(x, y) < R(x, 1) \quad \text{(Equation 5)}$$

$$\frac{\rho_A \times N^2 \times L \times a}{A_S \times \eta} \times \{x + y \times (1-x)\}\left\{x + \frac{\rho_B}{\rho_A}\frac{(1-x)}{y}\right\} <$$

$$\frac{\rho_A \times N^2 \times L \times a}{A_S \times \eta} \times \{x + 1 \times (1-x)\}\left\{x + \frac{\rho_B}{\rho_A}\frac{(1-x)}{y}\right\}$$

$$\{x + y \times (1-x)\}\left\{x + \frac{\rho_B}{\rho_A}\frac{(1-x)}{y}\right\} <$$

$$\{x + 1 \times (1-x)\}\left\{x + \frac{\rho_B}{\rho_A}\frac{(1-x)}{y}\right\}$$

From the equation 5, a following equation 6 is deduced.

[Mathematical 6]

$$y^2 - \left(\frac{\rho_B}{\rho_A} + 1\right)y + \frac{\rho_B}{\rho_A} < 0 \quad \text{(Equation 6)}$$

$$\left(y - \frac{\rho_B}{\rho_A}\right)(y - 1) < 0$$

As can be seen from the equation 6, in case of $1 < y < \rho_B/\rho_A$, the winding resistance $R_{(x, y)}$ of the electric wires A, B coexisting in the same slot becomes smaller, as compared to the case where the sectional areas $S_A$, $S_B$ of the electric wires A, B are the same. Also, the equation $1 < y < \rho_B/\rho_A$ is a mathematical equation to deduce two following points. A first point is a configuration where a ratio of a sectional area of a material having a high electrical resistivity to a sectional area of a material having a low electrical resistivity in the slot 4 is equal to or larger than 1. A second point is a configuration where the ratio is equal to or smaller than a ratio of the electrical resistivity of the material having the high electrical resistivity to the electrical resistivity of the material having the low electrical resistivity.

Also, as can be seen from the equation 6, in case of $y=\rho_B/\rho_A$, the winding resistance $R_{(x, y)}$ of the electric wires A, B coexisting in the same slot 4 is equivalent to the case where the sectional areas $S_A$, $S_B$ of the electric wires A, B are the same.

Next, a configuration of the stator 1 of the first embodiment will be described in detail. In the first embodiment, as shown in FIG. 3, the copper wire 6a is used as the electric wire A and the aluminum wire 6b is used as the electric wire B. Also, as shown in FIG. 3, a winding method of the copper wire 6a and the aluminum wire 6b is concentrated winding.

In FIG. 3, an area D indicates an area that is occupied by the copper wire 6a in the slot 4. That is, the area D is a total sum of the sectional areas of the copper wire 6a in the slot 4. In FIG. 3, an area E indicates an area that is occupied by the aluminum wire 6b in the slot 4. That is, the area E is a total sum of the sectional areas of the aluminum wire 6b in the slot 4. In FIG. 3, a ratio of the area E occupied by the aluminum wire 6b to a summed area of the area D and the area E is larger than 50% and smaller than 61%.

Here, the electrical resistivity $\rho_A$ of copper is 16.8 nΩ·m. The electrical resistivity $\rho_B$ of aluminum is 26.5 nΩ·m. Also, the sectional area of the copper wire 6a is referred to as $S_{Cu}$, and the sectional area of the aluminum wire 6b is referred to as $S_{Al}$.

As described above, y is (the sectional area of the electric wire B)/(the sectional area of the electric wire A). Therefore, it can be shown that $y=S_{Al}/S_{Cu}$. Thus, '$1<y<\rho_B/\rho_A$' of the equation 6 can be replaced with a following equation 7.

[Mathematical 7]

$$1 < \frac{S_{Al}}{S_{Cu}} < \frac{26.5}{16.8} \quad \text{(Equation 7)}$$

$$\frac{26.5}{16.8} \approx 1.58$$

Also, a following equation 8 is satisfied.

[Mathematical 8]

$$1 + \frac{S_{Cu}}{S_{Al}} = \frac{S_{Al} + S_{Cu}}{S_{Al}} \quad \text{(Equation 8)}$$

From the equations 7 and 8, a following equation 9 is deduced.

[Mathematical 9]

$$0.5 < \frac{S_{Al}}{S_{Al} + S_{Cu}} < \frac{1}{1 + \frac{16.8}{26.5}} \quad \text{(Equation 9)}$$

$$\frac{1}{1 + \frac{16.8}{26.5}} \approx 0.61$$

That is, as shown by the equation 9, the ratio of an occupying area of the aluminum wire 6b in the slot 4 to an occupying area of the windings 6 in the slot 4 is set to be larger than 50% and smaller than 61%. Here, the occupying area is a product of the sectional area of the electric wire and the number of turns.

In other words, in FIG. 3, an area ratio of the area E occupied by the aluminum wire 6b to the summed area of the area D and the area E is set to be larger than 50% and smaller than 61%. Thereby, as described with reference to the equation 6, the winding resistance R can be reduced, as compared to the case where the sectional area $S_{Cu}$ of the copper wire 6a and the sectional area $S_{Al}$ of the aluminum wire 6b are the same.

Here, a configuration where the occupying area of the copper wire 6a and the occupying area of the aluminum wire 6b are the same in the same slot 5 may be possible. Also, the ratio of the occupying area of the aluminum wire 6b in the slot 4 to the occupying area of the windings 6 in the slot 4 may be set to be 61%.

Second Embodiment

Hereinafter, configurations of the stator 1 and the electric motor according to a second embodiment will be described. The same or equivalent means and configurations as the first embodiment are denoted with the same terms and reference numerals, and the descriptions thereof are omitted.

In the second embodiment, a stator is particularly described in which a ratio of a sectional area of a material having a high electrical resistivity to a sectional area of a material having a low electrical resistivity in the slot is equivalent to a square root of a ratio of the electrical resistivity of the material having the high electrical resistivity to the electrical resistivity of the material having the low electrical resistivity.

Figure 4:
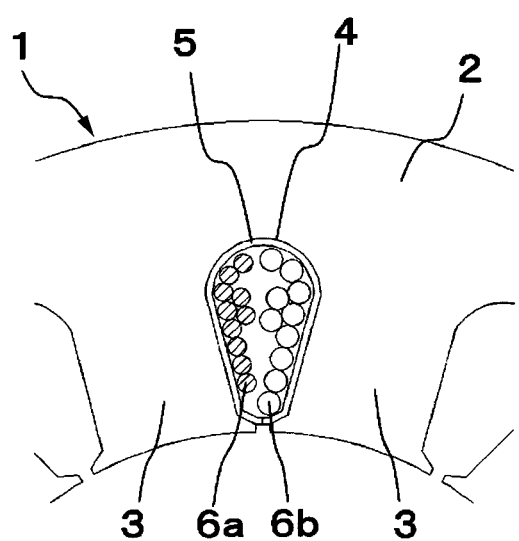
FIG. 4 is a partial sectional view of the stator according to a second embodiment of the present invention.

FIG. 4 is a partial sectional view of the stator 1 according to the second embodiment of the present invention, in which the C part of FIG. 2 is enlarged.

As shown in FIG. 4, the copper wire 6a and the aluminum wire 6b are provided in the same slot 4. The copper wire 6a and the aluminum wire 6b are wound around the tooth portions 3 of the stator core 2. Also, as shown in FIG. 4, the winding method of the copper wire 6a and the aluminum wire 6b is concentrated winding.

In FIG. 4, the number of turns of the windings 6 disposed in the same slot 4 is 20 turns. Also, an occupying area of the windings 6 provided in the same slot 4 is 55% of the area of the slot 4.

Also, in the second embodiment, as shown in FIG. 4, the numbers of turns of the copper wire 6a and the aluminum wire 6b are 10 turns, respectively. A wire diameter of the copper wire 6a is 0.45 mm. A wire diameter of the aluminum wire 6b is 0.55 mm.

Next, a principle of the second embodiment will be described. In order to obtain a minimum value of the winding resistance $R_{(x, y)}$, the equation 4 of the first embodiment is partially differentiated with respect to y. Thereby, a following equation 10 is deduced.

[Mathematical 10]

$$\frac{\partial}{\partial y}R(x, y) = \frac{\partial}{\partial y}\frac{\rho_A \times N^2 L \times a}{As \times \eta} \times \left\{x^2 + xy(1-x) + \frac{\rho_B}{\rho_A}\frac{x(1-x)}{y} + \frac{\rho_B}{\rho_A}(1-x)^2\right\} = \frac{\rho_A \times N^2 L \times a}{As \times \eta} \times \left\{x(1-x) - \frac{\rho_B}{\rho_A}\frac{x(1-x)}{y^2}\right\} \quad \text{(Equation 10)}$$

In the equation 10, the minimum value of the winding resistance $R_{(x, y)}$ is obtained when a following equation 11 is satisfied.

[Mathematical 11]

$$\frac{\partial}{\partial y} R(x, y) = 0 \qquad \text{(Equation 11)}$$

From the equations 10, 11, a following equation 12 is deduced.

[Mathematical 12]

$$\left\{ x(1-x) - \frac{\rho_B}{\rho_A} \frac{x(1-x)}{y^2} \right\} = x(1-x)\left(1 - \frac{\rho_B}{\rho_A} \frac{1}{y^2}\right) = 0 \qquad \text{(Equation 12)}$$

That is, from the equation 12, when a following equation 13 is satisfied, the winding resistance $R_{(x, y)}$ becomes smallest.

[Mathematical 13]

$$y = \sqrt{\frac{\rho_B}{\rho_A}} \qquad \text{(Equation 13)}$$

Next, the configuration of the stator 1 of the second embodiment will be described in detail. In the second embodiment, as shown in FIG. 4, the copper wire 6a is used as the electric wire A, and the aluminum wire 6b is used as the electric wire B.

In the second embodiment, a ratio of the sectional areas of the copper wire 6a and the aluminum wire 6b occupying the sectional area of the slot 4 is set to 1.26 times. This is the same as the square root of a ratio of the electrical resistivity 16.8 nΩ·m of copper and the electrical resistivity 26.5 nΩ·m of aluminum.

The numbers of turns of the copper wire 6a and the aluminum wire 6b are 10 turns, respectively. In this case, the wire diameter of the copper wire 6a is set to 0.45 mm. The wire diameter of the aluminum wire 6b is set to 0.55 mm. Thereby, the sectional area ratio of 1.26 times is satisfied. That is, in this case, it is possible to minimize the winding resistance.

Here, diameters of the electric wires that are generally distributed have discrete values. Also, the numbers of turns are natural numbers. For this reason, it is normally difficult to make the ratio of the sectional areas of the copper wire 6a and the aluminum wire 6b be equivalent to the square root of the ratio of the electrical resistivities. Therefore, the diameters of the electric wires are selected so that the ratio of the sectional areas is 1.3 times, not 1.26 times. Thereby, it is possible to minimize the winding resistance.

Also, the diameters of the electric wires may be selected so that the ratio of the sectional areas is within a range of 1.2 times to 1.4 times. The ratio of the sectional areas with which it is possible to minimize the winding resistance is included in the range of 1.2 times to 1.4 times. For this reason, when the diameters of the electric wires are selected so that the ratio of the sectional areas is within the range of 1.2 times to 1.4 times, it is possible to minimize the winding resistance. Here, when the ratio of the sectional areas is within the range of 1.2 times to 1.4 times, it is said that the ratio is within a range in which the ratio can be considered equivalent.

Third Embodiment

Hereinafter, configurations of the stator 1 and the electric motor according to a third embodiment will be described. The same or equivalent means and configurations as the first and second embodiments are denoted with the same terms and reference numerals, and the descriptions thereof are omitted.

Figure 5:
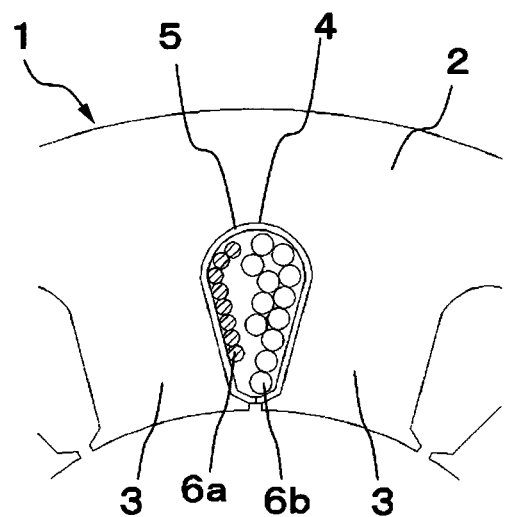
FIG. 5 is a partial sectional view of the stator according to a third embodiment of the present invention.

FIG. 5 is a partial sectional view of the stator 1 according to the third embodiment of the present invention, in which the C part of FIG. 2 is enlarged.

As shown in FIG. 5, the copper wire 6a and the aluminum wire 6b are provided in the same slot 4. The copper wire 6a and the aluminum wire 6b are wound around the tooth portions 3 of the stator core 2. Also, as shown in FIG. 5, the winding method of the copper wire 6a and the aluminum wire 6b is concentrated winding.

In FIG. 5, the number of turns of the windings 6 provided in the same slot 4 is 20 turns. Also, an occupying area of the windings 6 formed in the same slot is 55% of the area of the slot 4.

In the third embodiment, as shown in FIG. 5, the number of turns of the copper wire 6a is 8 turns. The number of turns of the aluminum wire 6b is 12 turns. In this case, the wire diameter of the copper wire 6a is set to 0.4 mm. The wire diameter of the aluminum wire 6b is set to 0.55 mm. Thereby, the ratio of the sectional areas of the copper wire 6a and the aluminum wire 6b occupying the sectional area of the slot 4 is 1.26 times. In this case, as described in the second embodiment, it is possible to minimize the winding resistance.

That is, even when the number of turns of the copper wire 6a and the aluminum wire 6b are different, since the configuration enabling the ratio of the sectional areas to be 1.26 times is provided, it is possible to minimize the winding resistance.

Here, the diameters of the electric wires that are generally distributed have discrete values. Also, the numbers of turns are natural numbers. For this reason, it is normally difficult to make the ratio of the sectional areas of the copper wire 6a and the aluminum wire 6b be equivalent to the square root of the ratio of the electrical resistivities. Therefore, the diameters of the electric wires are selected so that the ratio of the sectional areas is 1.3 times, not 1.26 times. Thereby, it is possible to minimize the winding resistance.

Also, the diameters of the electric wires may be selected so that the ratio of the sectional areas is within a range of 1.2 times to 1.4 times. The ratio of the sectional areas with which it is possible to minimize the winding resistance is included in the range of 1.2 times to 1.4 times. For this reason, when the diameters of the electric wires are selected so that the ratio of the sectional areas is within the range of 1.2 times to 1.4 times, it is possible to minimize the winding resistance. Also, when the ratio of the sectional areas is within the range of 1.2 times to 1.4 times, it is said that the ratio is within a range in which the ratio can be considered equivalent.

Fourth Embodiment

Hereinafter, configurations of the stator 1 and the electric motor according to a fourth embodiment will be described. The same or equivalent means and configurations as the first to third embodiments are denoted with the same terms and reference numerals, and the descriptions thereof are omitted.

Figure 6:
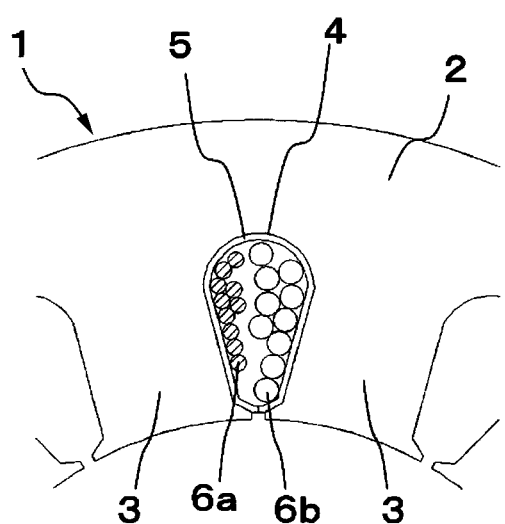
FIG. 6 is a partial sectional view of the stator according to a fourth embodiment of the present invention.

FIG. 6 is a partial sectional view of the stator 1 according to the fourth embodiment of the present invention, in which the C part of FIG. 2 is enlarged.

As shown in FIG. 6, the copper wire 6a and the aluminum wire 6b are disposed in the same slot 4. The copper wire 6a and the aluminum wire 6b are wound around the tooth portions 3 of the stator core 2. Also, as shown in FIG. 6, the winding method of the copper wire 6a and the aluminum wire 6b is concentrated winding.

In FIG. 6, the number of turns of the windings 6 formed in the same slot 4 is 20 turns. Also, an occupying area of the windings 6 formed in the same slot is 55% of the area of the slot 4.

Also, in the fourth embodiment, as shown in FIG. 6, the numbers of turns of the copper wire 6a and the aluminum wire 6b are 10 turns, respectively. The wire diameter of the copper wire 6a is set to 0.4 mm. The wire diameter of the aluminum wire 6b is set to 0.6 mm.

Next, a principle of the fourth embodiment will be described. In the fourth embodiment, the specific weights of the electric wires A, B described in the first embodiment are referred to as $\delta_A$, $\delta_B$, respectively. At this time, the weight m of the winding 6 is expressed by a following equation 14.

[Mathematical 14]

$$m = (\delta_A \times n_A \times L \times S_A + \delta_B \times n_B \times L \times S_B) \times a \quad \text{(Equation 14)}$$
$$= N \times L \times S_A \times S_A \times a \times \left\{\frac{\delta_B}{\delta_A} x + y(1-x)\right\}$$

From the equation 3 of the first embodiment and the equation 14, a following equation 15 is deduced.

[Mathematical 15]

$$m = N \times L \times S_A \times a \times \frac{As \times \eta}{N \times \{x + y(1-x)\}} \times \left\{\frac{\delta_B}{\delta_A} x + y(1-x)\right\} \quad \text{(Equation 15)}$$
$$= L \times S_A \times a \times As \times \eta \times \left\{1 + \frac{\left(\frac{\delta_B}{\delta_A} - 1\right)x}{x + y(1-x)}\right\}$$

That is, from the equation 15, it can be seen that as y increases, the weight m of the winding monotonically decreases. Therefore, within the range of $1 \leq y \leq \rho_B/\rho_A$, the weight m of the winding is lightest when $y = \rho_B/\rho_A$.

Next, a configuration of the stator 1 according to the fourth embodiment will be described in detail. In the fourth embodiment, as shown in FIG. 6, the copper wire 6a is used as the electric wire A, and the aluminum wire 6b is used as the electric wire B.

In the fourth embodiment, a ratio of the sectional areas of the copper wire 6a and the aluminum wire 6b occupying the sectional area of the slot 4 is set to 1.58 times. This is the same as the ratio of the electrical resistivity 16.8 n$\Omega$·m of copper and the electrical resistivity 26.5 n$\Omega$·m of aluminum.

The numbers of turns of the copper wire 6a and the aluminum wire 6b are 10 turns, respectively. In this case, the wire diameter of the copper wire 6a is set to 0.4 mm. The wire diameter of the aluminum wire 6b is set to 0.6 mm. Thereby, the sectional area ratio of 1.58 times is satisfied. That is, in this case, it is possible to make the winding resistance equivalent and to make the weight of the winding 6 lightest, as compared to the case where the sectional areas of the copper wire 6a and the aluminum wire 6b are made to be the same.

Here, the diameters of the electric wires that are generally distributed have discrete values. Also, the numbers of turns are natural numbers. For this reason, it is normally difficult to make the ratio of the sectional areas of the copper wire 6a and the aluminum wire 6b be equivalent to the ratio of the electrical resistivities. Therefore, the diameters of the electric wires are selected so that the ratio of the sectional areas is 1.6 times, not 1.58 times. Thereby, it is possible to make the winding resistance equivalent and to make the weight of the winding 6 lightest, as compared to the case where the sectional areas of the copper wire 6a and the aluminum wire 6b are made to be the same.

Also, the diameters of the electric wires may be selected so that the ratio of the sectional areas is within a range of 1.5 times to 1.7 times. The ratio of the sectional areas with which it is possible to make the winding resistance equivalent and to make the weight of the winding 6 lightest, as compared to the case where the sectional areas of the copper wire 6a and the aluminum wire 6b are made to be the same is included in the range of 1.5 times to 1.7 times. For this reason, when the diameters of the electric wires are selected so that the ratio of the sectional areas is within the range of 1.5 times to 1.7 times, it is possible to make the winding resistance equivalent and to make the weight of the winding 6 lightest, as compared to the case where the sectional areas of the copper wire 6a and the aluminum wire 6b are made to be the same. Here, when the ratio of the sectional areas is within the range of 1.5 times to 1.7 times, it is said that the ratio is within a range in which the ratio can be considered equivalent.

Fifth Embodiment

Hereinafter, configurations of the stator 1 and the electric motor according to a fifth embodiment will be described. The same or equivalent means and configurations as the first to fourth embodiments are denoted with the same terms and reference numerals, and the descriptions thereof are omitted.

Figure 7:
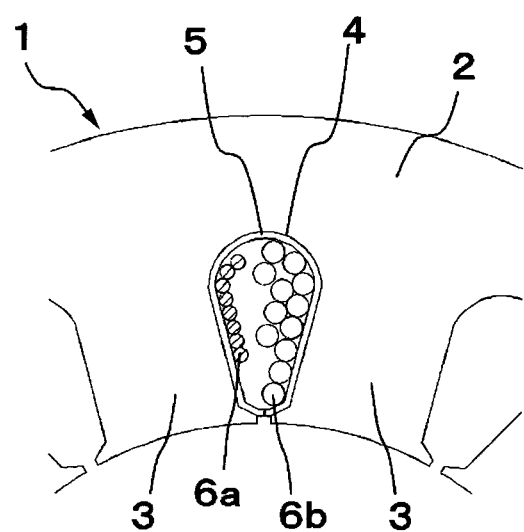
FIG. 7 is a partial sectional view of the stator according to a fifth embodiment of the present invention.

FIG. 7 is a partial sectional view of the stator 1 according to the fifth embodiment of the present invention, in which the C part of FIG. 5 is enlarged.

As shown in FIG. 7, the copper wire 6a and the aluminum wire 6b are disposed in the same slot 4. The copper wire 6a and the aluminum wire 6b are wound around the tooth portions 3 of the stator core 2. Also, as shown in FIG. 7, the winding method of the copper wire 6a and the aluminum wire 6b is concentrated winding.

In FIG. 7, the number of turns of the windings 6 disposed in the same slot 4 is 20 turns. Also, an occupying area of the windings 6 disposed in the same slot is 55% of the area of the slot 4.

In the fifth embodiment, as shown in FIG. 7, the number of turns of the copper wire 6a is 8 turns. The number of turns of the aluminum wire 6b is 12 turns. In this case, the wire diameter of the copper wire 6a is set to 0.35 mm. The wire diameter of the aluminum wire 6b is set to 0.55 mm. Thereby, the ratio of the sectional areas of the copper wire 6a and aluminum wire 6b occupying the sectional area of the slot 4 is 1.58 times. In this case, as described in the fourth embodiment, it is possible to make the winding resistance equivalent and to make the weight of the winding 6 lightest, as compared to the case where the sectional areas of the copper wire 6a and the aluminum wire 6b are made to be the same.

That is, even when the number of turns of the copper wire 6a and the aluminum wire 6b are different, since the configuration enabling the ratio of the sectional areas to be 1.58 times is provided, it is possible to make the winding resistance equivalent and to make the weight of the winding 6 lightest, as compared to the case where the sectional areas of the copper wire 6a and the aluminum wire 6b are made to be the same.

Also, the diameters of the electric wires may be selected so that the ratio of the sectional areas is within a range of 1.5 times to 1.7 times. The ratio of the sectional areas with which it is possible to make the winding resistance equivalent and to make the weight of the winding 6 lightest, as compared to the case where the sectional areas of the copper wire 6a and the aluminum wire 6b are made to be the same is included in the range of 1.5 times to 1.7 times. For this reason, when the diameters of the electric wires are selected so that the ratio of the sectional areas is within the range of 1.5 times to 1.7 times, it is possible to make the winding resistance equivalent and to make the weight of the winding 6 lightest, as compared to the case where the sectional areas of the copper wire 6a and the aluminum wire 6b are made to be the same. Here, when the ratio of the sectional areas is within the range of 1.5 times to 1.7 times, it is said that the ratio is within a range in which the ratio can be considered equivalent.

Here, the diameters of the electric wires that are generally distributed have discrete values. Also, the numbers of turns are natural numbers. For this reason, it is normally difficult to make the ratio of the sectional areas of the copper wire 6a and the aluminum wire 6b be equivalent to the ratio of the electrical resistivities. Therefore, the diameters of the electric wires are selected so that the ratio of the sectional areas is 1.6 times, not 1.58 times. Thereby, it is possible to make the winding resistance equivalent and to make the weight of the winding 6 lightest, as compared to the case where the sectional areas of the copper wire 6a and the aluminum wire 6b are made to be the same.

Here, in the first to fifth embodiments, the winding method of the copper wire 6a and the aluminum wire 6b is concentrated winding. However, the present invention is not limited thereto. For example, the winding method of the copper wire 6a and the aluminum wire 6b may be distributed winding.

Also, in the first to fifth embodiments, the stator 1 has 12 tooth portions 3 and 12 slots 4. However, the present invention is not limited thereto. For example, the numbers of the tooth portions 3 and the slots 4 may be three, six, nine, or larger.

In the first to fifth embodiments, the copper wire 6a is used as the electric wire A, and the aluminum wire 6b is used as the electric wire B. The copper wire 6a has low electrical resistivity low and the energy loss is small. In the meantime, the aluminum wire 6b is lighter and cheaper, as compared to the copper wire 6a. That is, in the first to fifth embodiments, the copper wire 6a and the aluminum wire 6b are used, so that it is possible to lighten the stator 1 and to save the cost.

In the first to fifth embodiments, the copper wire 6a is used as the electric wire A, and the aluminum wire 6b is used as the electric wire B. However, the present invention is not limited thereto. For example, silver, copper, gold, aluminum and the like may be selected and used for the electric wire A and the electric wire B.

FIG. 8 is a table showing a combination of electric wire materials and a ratio of electrical resistivities thereof according to the first to fifth embodiments of the present invention. The ratio of the electrical resistivities is a ratio of an electrical resistivity relating to metal having a high electrical resistivity to an electrical resistivity relating to metal having a low electrical resistivity. Also, regarding the electrical resistivity of each material, silver has an electrical resistivity of 15.9 nΩ·m, copper has an electrical resistivity of 16.8 nΩ·m, gold has an electrical resistivity of 22.1 nΩ·m, and aluminum has an electrical resistivity of 26.5 nΩ·m at 20° C.

In FIG. 8, the electric wire A in the column is metal having a low electrical resistivity, and the electric wire B in the row is metal having a high electrical resistivity. The numerical values in FIG. 8 indicate the ratio $\rho_B/\rho_A$ of the electrical resistivities of the electric wires A, B. For example, in FIG. 8, a ratio of the electrical resistivity of aluminum serving as the electric wire B to the electrical resistivity of copper serving as the electric wire A is 1.58 at 20° C. The values in FIG. 8 are all values at 20° C., and the values change as the temperature changes.

Regarding the materials of the electric wires according to the first to fifth embodiments, two different metals are selected from silver, copper, gold and aluminum. That is, one of silver, copper and gold is selected as the material of the electric wire A, and a material having a higher electrical resistivity than the electric wire A is selected as the material of the electric wire B. Specifically, when silver is selected as the material of the electric wire A, one of copper, gold and aluminum is selected as the material of the electric wire B. When copper is selected as the material of the electric wire A, one of gold and aluminum is selected as the material of the electric wire B. When gold is selected as the material of the electric wire A, aluminum is selected as the material of the electric wire B. It is obvious that even when the combination of these materials is selected as the materials of the electric wire A and the electric wire B, it does not hinder the effects accomplished in the stator 1 and the electric motor according to the first to fifth embodiments.

DESCRIPTION OF REFERENCE NUMERALS

1: stator
2: stator core
3: tooth portion
4: slot
5: insulating paper
6a: copper wire
6b: aluminum wire

The invention claimed is:
1. A stator comprising:
a cylindrical stator core;
a plurality of tooth portions formed along a circumferential direction of the stator core, and
windings disposed in a plurality of slots formed between the tooth portions and wound around the tooth portions, characterized in that:
the windings are configured by materials having different electrical resistivities, and
a ratio of a sectional area of a material having a high electrical resistivity to a sectional area of a material having a low electrical resistivity in the slot is equal to a square root of a ratio of the electrical resistivity of the material having the high electrical resistivity to the electrical resistivity of the material having the low electrical resistivity.
2. A stator comprising:
a cylindrical stator core;
a plurality of tooth portions formed along a circumferential direction of the stator core, and
windings disposed in a plurality of slots formed between the tooth portions and wound around the tooth portions, characterized in that:
the windings are configured by materials having different electrical resistivities, and a material having a low electrical resistivity is copper and a material having a high electrical resistivity is aluminum, and
a ratio of a sectional area of the windings using aluminum as the material to a sectional area of the windings using copper as the material is within a range in which the ratio can be considered equivalent to a square root of the ratio of the electrical resistivity of aluminum to the electrical resistivity of copper.

3. An electric motor comprising:
a cylindrical stator core;
a plurality of tooth portions formed along a circumferential direction of the stator core,
windings disposed in a plurality of slots formed between the tooth portions and wound around the tooth portions,
a rotor that rotates based on a magnetic field generated by the windings, and
a shaft fixed to the rotor and transmitting a rotational force of the rotor to an external member,
characterized in that:
the windings are configured by materials having different electrical resistivities, and
a ratio of a sectional area of a material having a high electrical resistivity to a sectional area of a material having a low electrical resistivity in the slot is equal to a square root of a ratio of the electrical resistivity of the material having the high electrical resistivity to the electrical resistivity of the material having the low electrical resistivity.

4. An electric motor comprising:
a cylindrical stator core;
a plurality of tooth portions formed along a circumferential direction of the stator core,
windings disposed in a plurality of slots formed between the tooth portions and wound around the tooth portions,
a rotor that rotates based on a magnetic field generated by the windings, and
a shaft fixed to the rotor and transmitting a rotational force of the rotor to an external member,
characterized in that:
the windings are configured by materials having different electrical resistivities, and a material having a low electrical resistivity is copper and a material having a high electrical resistivity is aluminum, and
a ratio of a sectional area of the windings using aluminum as the material to a sectional area of the windings using copper as the material is within a range in which the ratio can be considered equivalent to a square root of the ratio of the electrical resistivity of aluminum to the electrical resistivity of copper.

* * * * *